United States Patent [19]

Tu et al.

[11] 3,920,426

[45] Nov. 18, 1975

[54] AIR FILTER

[75] Inventors: Peter K. C. Tu, Westerville; Alan H. Brooke, Hudson, both of Ohio; Frank S. Miller, Norwell, Mass.

[73] Assignee: Rockwell International Corporation, Pittsburgh, Pa.

[22] Filed: May 22, 1974

[21] Appl. No.: 472,410

Related U.S. Application Data

[60] Continuation of Ser. No. 335,997, Feb. 26, 1973, abandoned, Division of Ser. No. 126,046, March 19, 1971, abandoned.

[52] U.S. Cl. .......................... 55/337; 55/419; 55/455
[51] Int. Cl.² .......................................... B01D 50/00
[58] Field of Search ............ 55/337, 348, 455, 456, 55/419

[56] References Cited
UNITED STATES PATENTS
2,731,102   1/1956   James ................................. 55/348

FOREIGN PATENTS OR APPLICATIONS
761,710   11/1956   United Kingdom ................. 55/337
933,936   8/1963   United Kingdom .................. 55/346

*Primary Examiner*—Bernard Noziek

[57] ABSTRACT

An air filter for removing particulate matter from an airstream comprising a casing with a first air guide means for efficiently directing the uncleansed particulate-laden air into an inertial separating means enclosed within said casing, said inertial separating means adapted to remove relatively heavy particles from the airstream; a second air guide means for efficiently directing the airstream from said inertial separation means to the outer surface of the filter media of a filter enclosed within said casing and surrounding said inertial separating means, said filter media removing substantially all of the remaining particulate matter from said airstream; and a third air guide means for efficiently directing the now cleansed airstream out of said air filter.

1 Claim, 16 Drawing Figures

AIR FILTER

This application is a continuation of application Ser. No. 335,997, filed Feb. 26, 1973, now abandoned which was a division of application Ser. No. 126,046, filed Mar. 19, 1971 now abandoned.

The present invention relates to an air filter adapted for use in connection with various types of intake systems of internal combustion engines and the like. Such engines may be used, for example, on over-the-road vehicles, such as tractors, trucks, and heavy-duty personnel carriers. However, an air cleaner in accordance with the present invention may have many varied uses in the air cleaning and air pollution control field. Historically, engine-propelled vehicles, such as tractors and the like, utilize filters in their air intake systems. In view of the obvious mobility of such type of vehicles, they travel through many types of terrains and encounter varied conditions with respect to pollutants in the air. It is important, therefore, to strike the proper balance between sufficient time between maintenance of these filters and the assurance that the air taken into the air intake system is clean.

It is well known and understood that if particulate matter should enter the intake system of an engine, such as a highly sophisticated diesel engine, over a period of time it might cause serious damage and considerable down time. It is therefore, important to increase both the efficiency of the filter and its dirt holding capacity, while at the same time, increasing the period between overhaul or filter replacement.

SUMMARY OF THE INVENTION

It is, therefore, a primary object of the present invention to provide an air filter which efficiently and effectively removes particulate matter from an airstream that requires a minimum maintenance and down time.

It is another object of the present invention to provide an air cleaner having a precleaner and, in particular, an inertial separator such as a vortex-tube precleaner or a cyclone separator precleaner, which is adapted to remove relatively heavier particles from the airstream, and a dry filter surrounding the inertial separator which acts as a "final filter," the air filter being further provided with air guide means to direct the air first into the inertial separator and a second air guide means to redirect the flow out of the inertial separator to the outside of the dry air filter, the dry air filter removing any particulate matter left in the airstream after separation action within the inertial separator. The air then is directed by a third air guide means outside of the air filter and then into, for example, the air intake system of an internal combustion engine.

It is a further object of the present invention to provide an air filter which may be maintained under less than ideal situations. A substantial amount of the particulate matter in the airstream may be removed by the inertial separating means, and the collected matter may be continually pulsed to the atmosphere, thus reducing the required maintenance of the air filter. In the alternative, it could be collected in a container and could be merely cleaned upon removal from the air filter. The dry type air filter may also easily be replaced and/or cleaned, if appropriate. This would require the use of no special tools or skills and, if necessary, could be done in the field.

An air filter embodying the concept of the present invention is adapted to remove substantially all particulate matter such as dust and other pollutants from an airstream. The air filter is provided with a first guide means for efficiently directing the particulate-laden air into an inertial separating means such as a vortex-tube separating means or a cyclone separating means which is enclosed within a casing. The inertial separating means is adapted to remove relatively heavy particles from the airstream. The air filter is also provided with a second air guide means for efficiently directing the airstream from the inertial separating means to the outer surface of the filter media of a dry type air filter. The air filter is enclosed within the casing and may surround the inertial separating means. The filter media of the dry type air filter will remove substantially all of the remaining particulate matter from the airstream.

The air filter is also provided with a third air guide means for efficiently directing the new cleansed airstream out of the air filter. The cleansing action of the air filter in accordance with the present invention will be achieved with a minimum of pressure drop which will, of course, allow the engine or apparatus to which it is connected to operate more efficiently.

These and other objects of the invention, as well as the advantages thereof over the existing prior art forms, will become apparent from the following detailed description of the attached drawings and are accomplished by means hereinafter described and claimed.

Several preferred embodiments of the present invention are shown by way of example in the accompanying drawings and are described in detail without attempting to show all of the various forms and modifications in which the invention may be embodied; the invention being measured by the appended claims and not by the details of the specification.

DESCRIPTION OF THE PREFERRED EMBODIMENT

Figure 1:
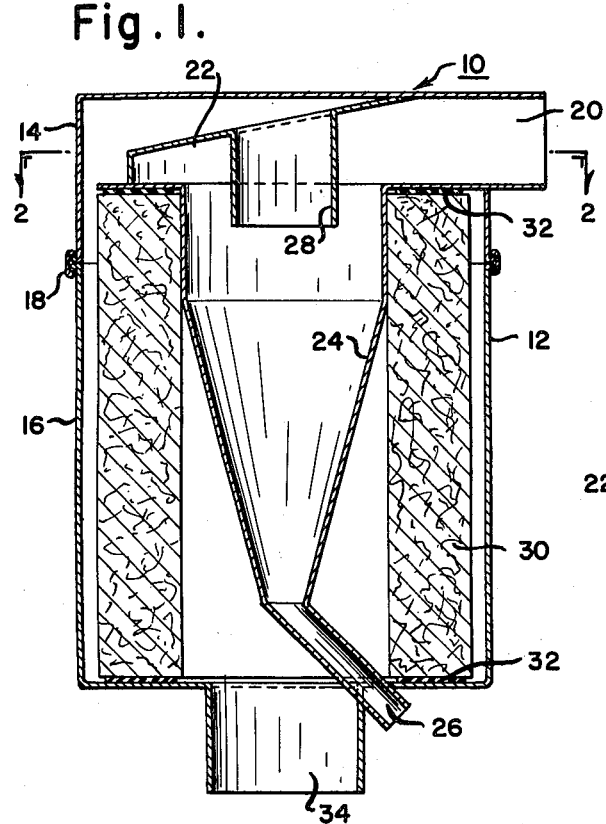
FIG. 1 is a side elevational view in section of an air filter in accordance with an embodiment of the present invention.
Figure 2:
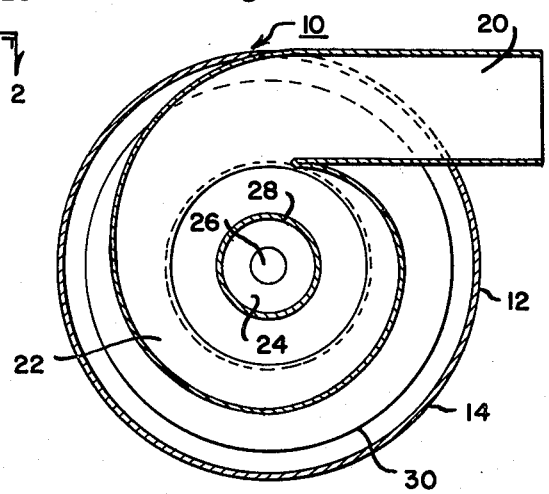
FIG. 2 is a transverse sectional view of the air filter of FIG. 1 taken along line 2—2.
Figure 3:
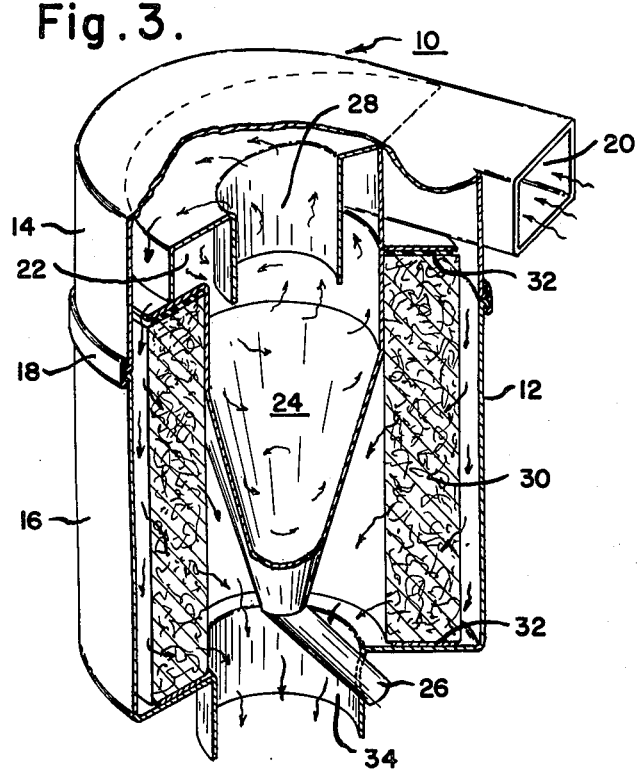
FIG. 3 is a perspective view of the air filter of FIG. 1 with parts broken away and in section.

Referring now to the drawings and, in particular, FIGS. 1–3, there is therein depicted an air filter embodying the concept of the present invention. The air filter 10 is provided with a casing 12. The casing 12 may have an upper part 14 and a lower part 16. The upper part 14 and the lower part 16 may be connected together at a joint by means such as a clamping means 18. The clamping means may be any suitable attachment which will insure an air tight fit between the two parts of the casing 12. Casing 12 may be shaped in any suitable manner so as to house or enclose the various parts contained therein. The shaping of the casing 12 may also take into account the various applications to which it may be put. Typically, the casing is cylindrically shaped and adapted for mounting on an over-the-road vehicle, such as a tractor-trailer, and in such a position so as to enable easy and ready maintenance.

The upper part 14 of the casing 12 is provided with an inlet passage 20 which forms a spiral path and is in communication with the inlet ducting 22. Accordingly, the dust-laden air enters through the inlet passage and a preswirling motion is imparted to it as it enters the inlet ducting 22. The inlet ducting 22 is in communication with the upper part of the inertial separator 24, and accordingly, the particulate-laden air enters the cyclone separator 24 as a swirling mass.

The swirling action of the air is graphically illustrated in FIG. 3. In fact, the overall air pattern is therein disclosed. It can be seen that the swirling mass of air moves from the top of the cyclone separator 24 toward the bottom and, in particular, toward the conically shaped section of the separator and then is naturally redirected upwardly toward the central cylindrical baffle 28. During the period of time that the dirt-laden air is in the cyclone separator 24, the relatively heavier particles entrained within the airstream are, by centrifugal action, forced against the walls of the separation and then down the side to the dust collecting tube 26. The tube 26 could be in communication with a dust or dirt collecting enclosure (not shown) or could be in communication with a device (also not shown) commonly referred to as an unloader valve, which would pulse the collected dust to the atmosphere. The pulsation, of course, could be caused by or enhanced by the action of the pistons of the reciprocating engine whose intake air system the air filter may be connected to. The now partially cleansed air is then directed up to and flows through the interior portion of the central cylindrical baffle 28 and is directed to the outside surface of the filter 30 by means of the reverse side of the inlet ducting.

The filter 30 may be of many commercially available types, such as the commercially available elongated dry type filter units having pleated paper media which are used today on the air intake systems of tractor diesels. These type filters are adapted to remove fine particulate matter, such as dust, from an airstream. The media of the filter could be varied depending upon the operating environment. It could be, for example, made from fiberglass or other similar type media. The filter 30 may be provided with seals 32 which insure that the filter 30 is in airtight relation with respect to the casing 12 so as to obviate any bypass of dust- or dirt-laden air past the filter. It is to be noted that the flow pattern in accordance with the present invention provides for the air flowing first to the cyclone separator and then to the outside of the dry type air filter. By such an interrelationship of the separator and the air filter, the positive characteristics of each type of separating device is maximized. In other words, the cyclone separator 24 efficiency is maximized by first imparting a swirling motion to the airstream and effecting the airstream to have two passes within the separator. The efficiency of the air filter 30 is also maximized in that the flow pattern is from the outside to the inside, which means that a greater surface area is available to the airstream, while at the same time the overall size of the air filter 10 is minimized. As may be graphically seen from FIG. 3, the air flow is through the filter 30 and then out of the air filter 10 via the outlet passage 34. Outlet passage 34 may be in communication with the intake manifold or other intake ducting of an internal combustion engine or the like (not shown). The filter 30 is shown surrounding the cyclone separator 24 in such a manner that a portion of the cyclone separator, that is the upper cylindrical portion is in close relation to the filter media of the filter 30. This, of course, can be varied according to the inside diameter of the filter 30 or the outside diameter of the cylindrical portion of the cyclone separator 24. The sealing, of course, as indicated before, of the filter is accomplished by the seal 32.

Figure 4:
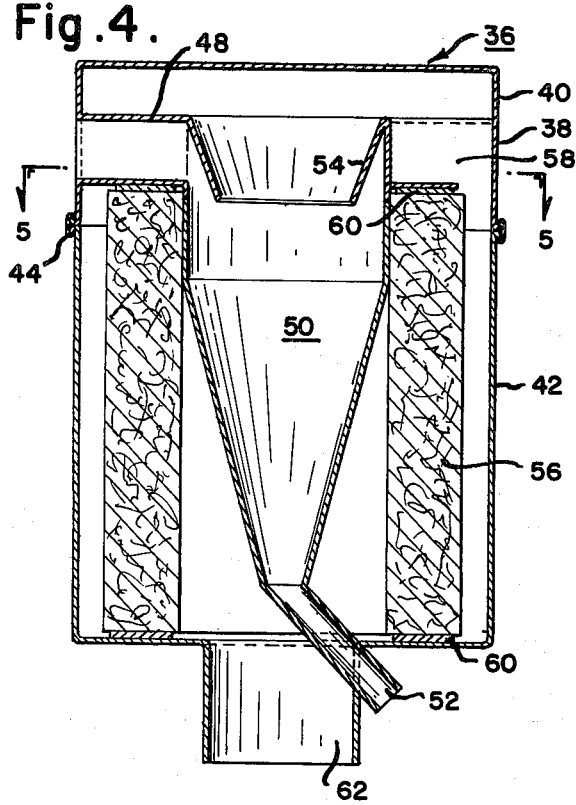
FIG. 4 is a side elevational view in section of an air filter in accordance with another embodiment of the present invention.
Figure 5:
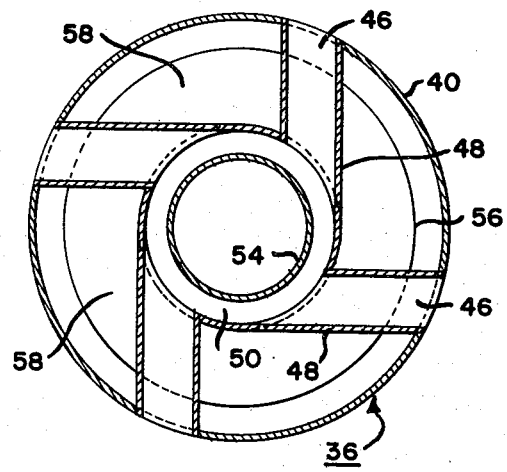
FIG. 5 is a transverse sectional view of the air filter of FIG. 4 taken alone line 5—5.
Figure 6:
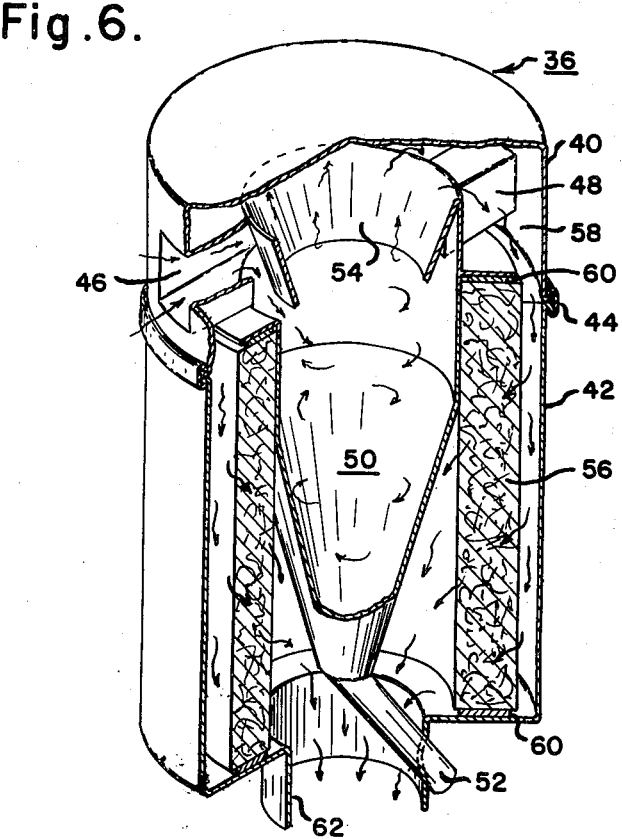
FIG. 6 is a perspective view of the air filter of FIG. 4 with parts broken away and in section.

Referring now to FIGS. 4, 5 and 6, there is shown another air filter 36 which is in accordance with the concept embodying the present invention.

The air filter 36 is provided with a casing 38, which may have an upper part 40 and a lower part 42. The upper part 40 and the lower part 42 of the casing 38 may be joined in an airtight manner by a clamping means 44. As before suggested, the size, shape and overall configuration of the casing will, of course, be determined by the application to which the air filter 36 is put.

As with the above-described air filter 10, the casing 38 will typically be cylindrically shaped and adapted for mounting on over-the-road vehicles, such as tractor-trailers, and in such position as to enable easy and ready maintenance. The upper part 40 of the casing 38 is provided with multiple inlet passages 46 which are tangentially disposed with respect to the inlet ducting 48. By so arranging the multiple inlet passages 46 with respect to the inlet ducting, the dust-laden air will have a preswirling motion imparted to it. The multiple inlet passages could each individually be open to atmosphere or may be manifolded to a common duct (not shown) which, in turn, may have an individual inlet passage (also not shown). The inlet ducting 48 is in communication with the upper part of the cyclone separator and, accordingly, the particulateladen air enters the cyclone separator 50 as a swirling mass. The swirling action of the air is graphically illustrated in FIG. 6. The overall flow pattern within the air filter 36 is, in fact, therein disclosed. It is to be noted that this flow pattern is similar to the air flow pattern of the air filter of FIGS. 1–3 with certain differences to be later described.

The swirling mass of air moves from the top of the cyclone separator 50 toward the bottom and, in particular, toward the conically-shaped section of the separator. The air mass is then naturally redirected upwardly toward the central cylindrical baffle 54. During the period of time that the dirt-laden air is in the cyclone separator 50, the relatively heavier particles entrained within the airstream are, by centrifugal action, forced against the walls of the separator and then down the side to the dust collecting tube 52. As indicated before, the tube 52 could be in communication with a dust or dirt collecting enclosure (now shown) or could be in communication with a device (also not shown) commonly referred to as an unloader valve, which pulses the collected dust to the atmosphere. The pulsation, of course, could be caused by or enhanced by the action of the pistons of the reciprocating engine whose intake air system the air filter may be connected to. The now partially cleansed air is then directed up to and flows through the interior portion of the central cylindrical baffle 54 and is directed to the outside surface of the filter 56. The interior portion of the central cylindrical baffle 54 is in communication with a series of passages 58 which direct the flow of air to the aforementioned outer surface of the filter 56. The passages 58 are defined by the spaces between the multiple inlet passages 46.

The filter 56 is of the same type as the filter 30 as depicted in the air filter 10 of FIGS. 1–3.

The filter 56 is provided with seals 60 which insure that the filter 56 is in airtight relation with respect to the casing 38 so as to obviate any bypass of dust-or dirt-laden air past the filter. As before noted, the flow pattern in accordance with the present invention generally subjects the dirt-laden air to the cyclonic action of the cyclone separator and then to the filtration action of a dry type air filter. The efficiency of the cyclone separator 50 is maximized by imparting a swirling motion to the airstream through the action of the multiple inlet passages 46 and, further, the swirling mass in the cyclone separator is subjected to two passes; one pass as it enters the separator and a second one after it leaves. Additionally, the efficiency of the filter 56 is increased in that the flow pattern is from the outside to the inside, which means that a greater surface area is available to the airstream. As is clearly depicted in FIG. 6, the airflow is through the filter 56 and then out of the air filter 36 via the outlet passage 62. The outlet passage 62 may be in communication with the intake manifold or intake ducting of an internal combustion engine or the like (not shown). The filter 56 is shown surrounding the cyclone separator 50 in such a manner that a portion of the cyclone separator, that is, the upper cylindrical portion, is in close relation to the filter media of the filter 56. This of course, can be varied according to the inside diameter of the filter 56 or the outside diameter of the cylindrical portion of the cyclone separator 50.

Figure 7:
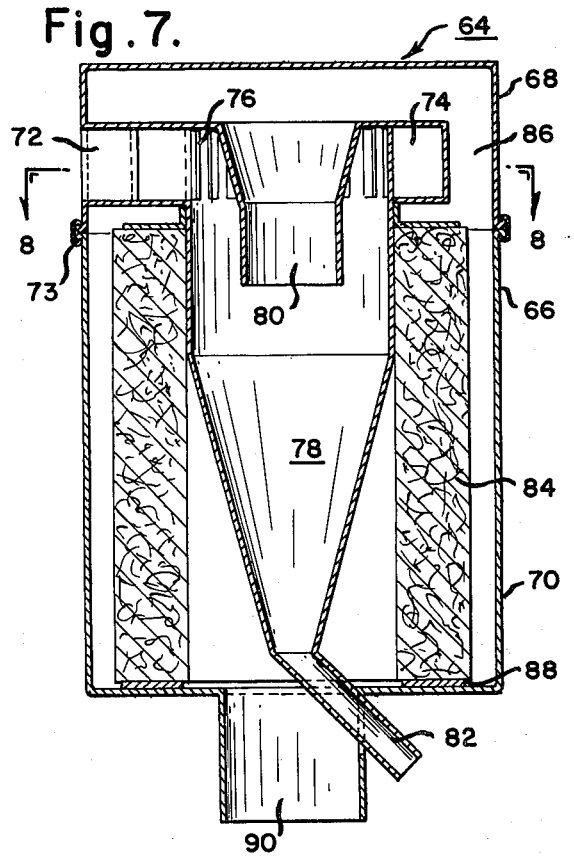
FIG. 7 is a side elevational view in section of an air filter in accordance with another embodiment of the present invention.
Figure 8:
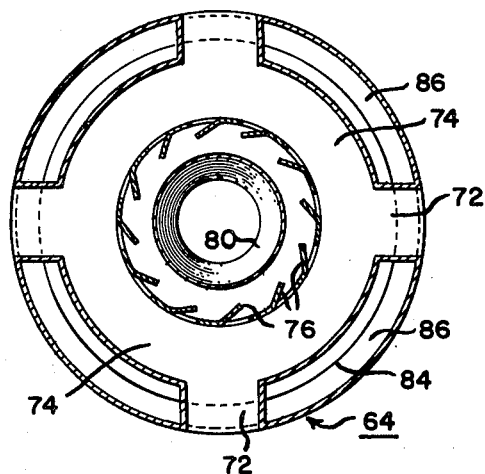
FIG. 8 is a transverse sectional view of the air filter of FIG. 7 taken along line 8—8.
Figure 9:
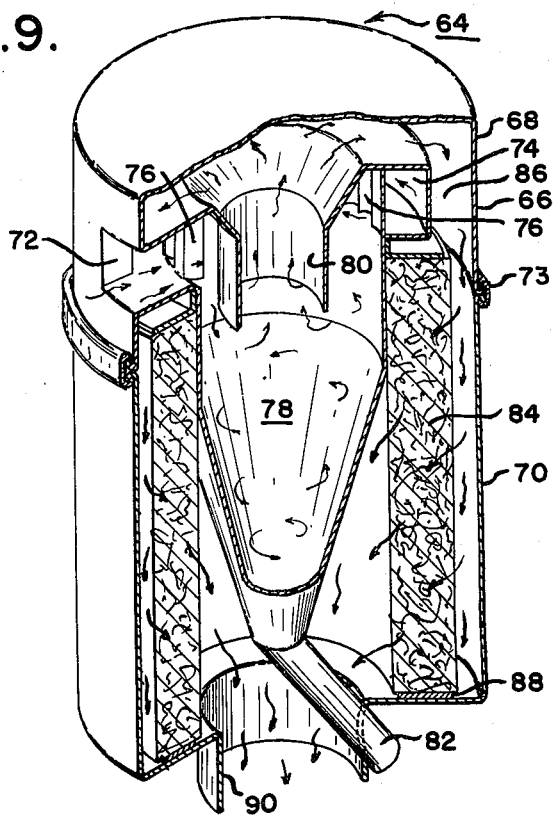
FIG. 9 is a perspective view of the air filter of FIG. 7 with parts broken away and in section.

Referring now to FIGS. 7–9, there is shown yet another air filter 64 which is in accordance with the concept embodying the present invention.

The air filter 64 is provided with a casing 66 which may have an upper part 68 and a lower part 70. The upper part 68 and the lower part 70 of the casing 66 may be joined in an airtight manner by a clamping means 73. As before suggested with respect to the air filters of FIGS. 1–6, the size, shape and overall configuration of the casing will be determined by the application to which the air filter is put. As with the above referred to air filters 10 and 36, the casing 66 will typically be cylindrically shaped and adapted for use on over-the-road vehicles, such as tractor-trailers, and placed in such a position on the trailer to afford easy and ready maintenance of air filter 64. The upper part 68 of the casing 66 is provided with multiple inlet passages 72 which are in communication with a common inlet duct 74. The common inlet duct is provided on its downstream side with a series of vanes 76. The vanes 76 are so arranged with respect to the inlet passages 72 that the dust-laden air entering the air filter 64 will have a preswirling motion imparted to it. The multiple inlet passages can each individually be opened to atmosphere or may be manifolded to a common duct (not shown) which, in turn, may have an individual inlet passage (not shown). The vanes 76 of the common inlet duct define a multiplicity of passages which are in communication with the upper part of the cyclone separator 78 and, accordingly, the dust- and dirtladen air enters the cyclone separator 78 as a swirling mass. The swirling action of the air is graphically illustrated in FIG. 9. The overall flow pattern within the air filter 64 is, in fact, therein disclosed. It is to be noted that the flow pattern is similar to the air flow pattern of the air filters 10 and 36 of FIGS. 1–6 with certain differences to be later described.

The swirling mass of air moves from the top of the cyclone separator 78 toward the bottom and, in particular, toward the conically shaped section of the separator. The air mass is then naturally redirected upwardly toward the central cylindrical baffle 80. During the period of time that the dirt-laden air is in the cyclone separator 78, the relatively heavier particles entrained within the airstream will, by centrifugal action, be forced against the walls of the separator and then down the sides to the dust collecting tube 82. As indicated before, the tube 82 could be in communication with a dust or dirt collecting enclosure (not shown) or could be in communication with a device (also not shown) commonly referred to as an unloader valve, which pulses the collected dirt or dust to the atmosphere. The pulsation could be caused by or enhanced by the pistons of the reciprocating engine in whose air intake system the air filter may be connected. The now partially cleansed air is naturally directed up to and flows through the interior portion of the central cylindrical baffle 80 and is, in turn, directed to the outside surface of the filter 84. The interior portion of the central cylindrical baffle 80 is in communication with a series of passages 86 which direct the flow of air to the aforementioned outer surface of the filter. The passages 86 are defined by the spaces between the multiple inlet passages 72.

The filter 84 may be of the same type of filter as used in the previously disclosed air filters 10 and 34. The filter 84 is provided with seals 88 which insure that the filter 84 is in airtight relation with respect to the casing 66 so as to obviate any bypass of the dust- or dirt-laden air past the filter 84. As previously described, the maximum efficiency of both the cyclone separator 78 and the dry type air filter 84 is maximized. The airflow is through the filter 84 and then out the air filter 64 via the outlet passage 90. The outlet passage 90 may be in communication with the intake manifold or intake ducting of the internal combustion engine (not shown), and the arrangement of the filter 84 with respect to the cyclone separator 78 is substantially the same as with respect to the previously described air filters 10 and 34 and need not be further described.

Figure 10:
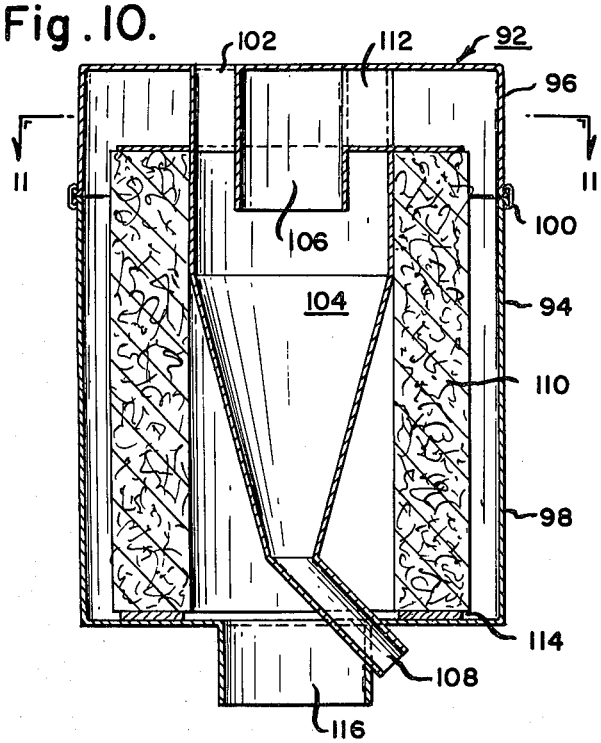
FIG. 10 is a side elevational view of an air filter in accordance with another embodiment of the present invention.
Figure 11:
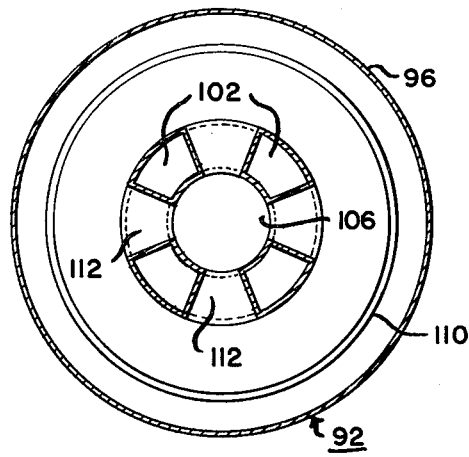
FIG. 11 is a transverse sectional view of the air filter of FIG. 10 taken along line 11—11.
Figure 12:
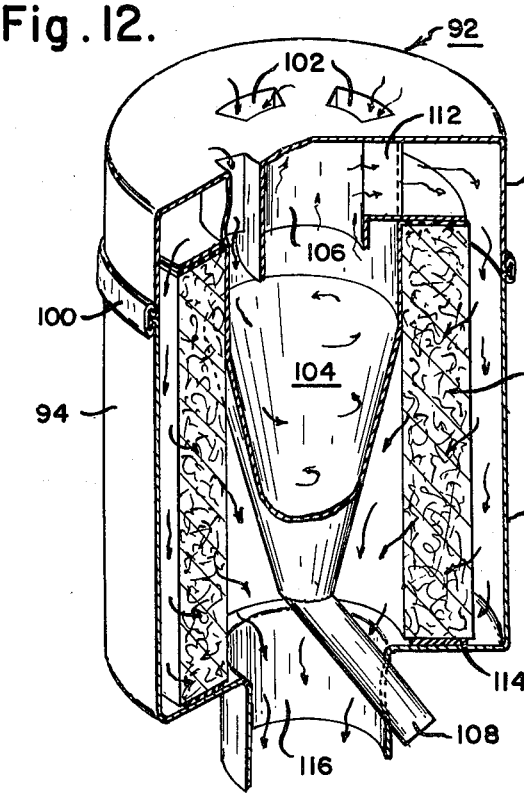
FIG. 12 is a perspective view of the air filter of FIG. 10 with parts broken away and in section.

Referring now to FIGS. 10–12, there is shown still another air filter 92 which is in accordance with the concept embodying the present invention.

The air filter 92 is provided with a casing 94 which may have an upper part 96 and a lower part 98. The upper part 96 and the lower part 98 of the casing 94 may be joined in an airtight manner by a clamping means 100. The casing 94, as with the casings of air filters 10, 36 and 64, will typically be cylindrically shaped and adapted for use on over-the-road vehicles, such as tractor-trailers, and placed in such a position on the trailer to afford easy and ready maintenance of the air filter 92.

The upper part 96 of the casing 94 is provided with multiple inlet passages 102, which are in communication with a cyclone separator 104. It can be seen that the arrangement of the multiple inlet passages of the air filter 92 is somewhat different from the arrangement of the multiple inlet passages of the air filters 10, 36 and 64. The previously described air passages are positioned on the sides of the casings of the filters, whereas the multiple inlet passages 102 of the air filter 92 are on the top of the upper part 96. Accordingly, the dirt-laden air will enter the cyclone separator 104 on a substantially direct and straight line. Of course, the multiple inlet passages 102 could be manifolded to a common duct (not shown) which, in turn, could have an individual inlet passage (not shown). The cyclone separator 104 will impart a swirling action to the dirt-laden air, and this is graphically illustrated in FIG. 12. The overall pattern within the air filter 92 is, in fact, therein disclosed. It is to be noted that with the above exception, the airflow pattern of the air filter 92 from this point on is substantially similar to the airflow pattern of the air filters 10, 36 and 64 0f FIGS. 1–9. The swirling mass of air in the cyclone separator moves from the top of the separator 104 toward the bottom and, in particular, toward the conically shaped section of the separator. The air mass is then naturally redirected upwardly toward the central cylindrical baffle 106. During the period of time that the dirt-laden air is in the cyclone separator, the relatively heavier particles entrained within the airstream are, by centrifugal action, forced against the walls of the separator and then down the side to the dust collecting tube 108. As mentioned with respect to the previously described air filters, the tube 108 could be in communication with the dust or dirt collecting enclosure (not shown) or in communication with a device (also not shown) commonly known as an unloader valve, which pulses the dirt or dust to the atmosphere. The now partially cleansed air is directed up to and flows through the interior portion of the central cylindrical baffle 106 and is directed to the outside surface of the filter 110. The interior portion of the central cylindrical baffle 106 is in communication with a series of passages 112 which direct the flow of air to the aforementioned outer surface of the filter 110. The passages 112 are defined by spaces between the multiple inlet passages 102.

The filter 110 is of the same type of filter as used in the previously disclosed air filters 10, 36 and 64. The filter 110 is provided with seals 114 which insure that the filter 110 is in airtight relation with respect to the casing 94 so as to obviate any bypass of the dust- or dirt-laden air past the filter 110. In a manner as previously described, the maximum efficiency of both the cyclone separator and the dry type air filter is maximized. The airflow is through the filter 110 and then out to air filter 92 via the outlet passage 116. The outlet passage 116 may be in communication with the intake manifold or intake ducting of an internal combustion engine (not shown) and the arrangement of the filter 110 with respect to the cyclone separator 104 is substantially the same as with respect to the previously described air filters 10, 36 and 64 and need not be further described.

Figure 13:
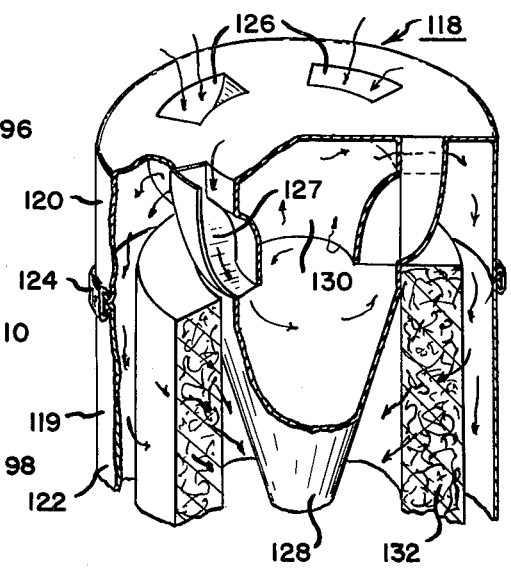
FIG. 13 is a partial side elevational view in section of an air filter in accordance with another embodiment of the present invention.

Referring now to FIG. 13, there is shown in partial perspective view, another air filter 118 which is in accordance with the concept embodying the present invention. The air filter 118 is provided with a casing 119 having an upper part 120 and a lower part 122, which may be joined together in an airtight manner by a clamping means 124. The air filter 118 is more akin to the air filter 92 of FIGS. 10–12 than to the other disclosed air filters in that the airflow is from the top. The upper part 120 of the air filter 118 is provided with multiple inlet passages 126 which are in communication with the cyclone separator 128. The multiple inlet passages 102 of the air filter 92 are disposed in such a manner with respect to the upper part 96 of the cyclone separator 104 that they define a substantially direct and straight airflow path for the dirt-laden air entering the cyclone separator 104. However, the multiple inlet passages 126 of the air filter 118 are in communication with inlet ducting 127 which defines a spiral path for the incoming dirt-laden air and, accordingly, imparts a preswirling motion to the inlet air. The separator 128 will complement the swirling motion imparted by the multiple inlet passages 126 to increase the velocity of the dirt-laden air. This overall action is graphically illustrated in FIG. 13. The airflow pattern of the air filter 118 from this point on is substantially similar to the airflow patterns of the air filters 10, 36 64 and 92 of FIGS. 1–12. Accordingly, the swirling mass of air in the cyclone separator will move first from the top of the separator 128 toward the bottom, conically shaped section of the separator. The air mass is then naturally redirected upwardly toward the central cylindrical baffle 120. The air will be partially cleansed through the action of the separator 128 in the manner previously described and is then directed to the outside surface of the filter 132. The flow of air will then, of course, be through the filter 132 to an outlet passage (not shown) which may be in communication with an intake air system of an engine.

Figure 15:
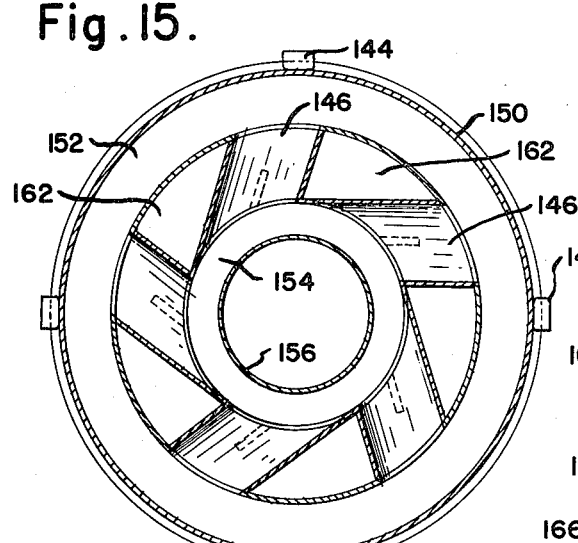
FIG. 15 is a transverse sectional view of the air filter of FIG. 14 taken along line 15—15.
Figure 14:
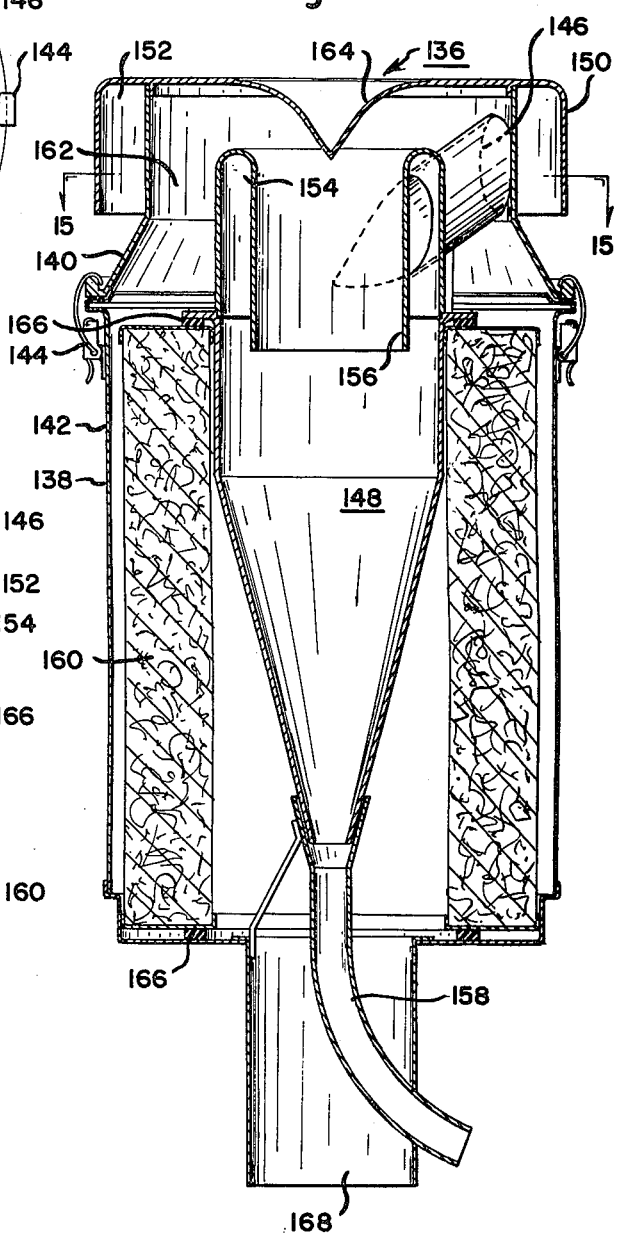
FIG. 14 is a side elevational view in section of an air filter in accordance with another embodiment of the present invention.
Figure 16:
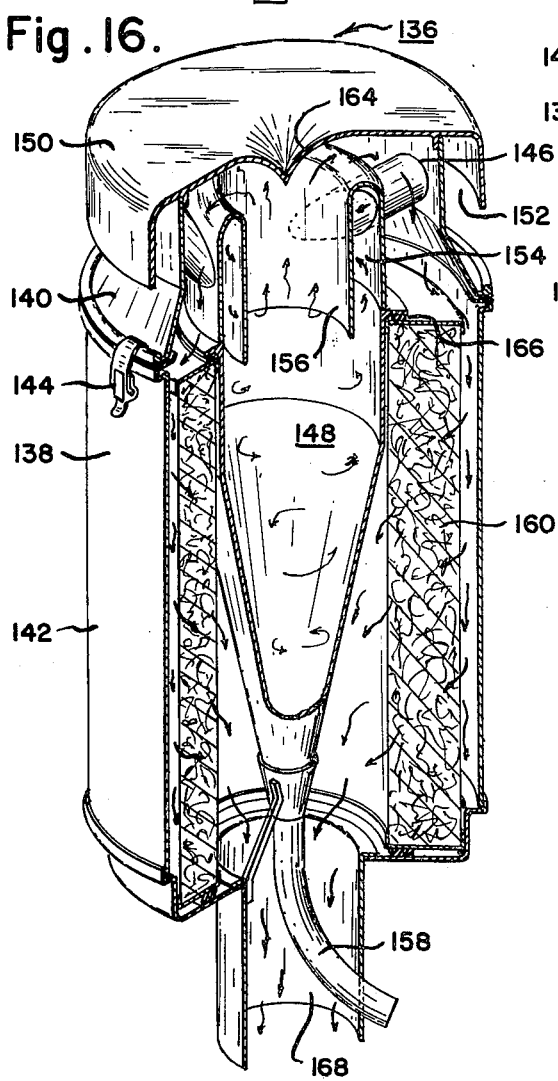
FIG. 16 is a perspective view of the air filter of FIG. 14 with parts broken away and in section.

Referring now to FIGS. 14–16, there is shown another air filter 136 which is in accordance with the concept embodying the present invention.

The air filter 136 is provided with a casing 138 having an upper part 140 and a lower part 142. The upper part 140 and the lower part 142 may be connected together at an airtight joint by clamping means 144. The casing 138, as with the casings of air filters 10, 34, 64, 92 and 118, will typically be cylindrically shaped and adapted to be used on over-the-road vehicles.

The upper part 140 of the casing 138 is provided with multiple inlet passages 146 which are, at their downstream end, in communication with a cyclone separator 148. The upper part 140 of the casing 138 is provided with a hood 150 which defines an annular inlet passage 152. It can be seen that the arrangement of the multiple inlet passages 146 is somewhat different from the arrangement of the multiple inlet passages of the previously described air filters in that they are both annularly and radially disposed relative to the cyclone separator 148. That is, the inlet side of the multiple inlet passages are on the side of the upper part 140, yet enter the inlet ducting 154 at such an angle as to impart a preswirling motion to the dirt-laden air entering the air filter 136. The annular inlet passage 152 provides a common inlet for the multiple inlet passages 146. The interior portion of the inlet ducting 154 provides a common outlet for the multiple inlet passages 152. Accordingly, the dust- and dirt-laden air enters the cyclone separator 148 as a swirling mass. The swirling action of the air is graphically illustrated in FIG. 16. The overall pattern within the air filter 136 is, in fact, therein disclosed. The swirling mass of air moves from the top of the cyclone separator 138 toward the bottom and, in particular, toward the conically shaped section of the separator. The air mass is naturally redirected upwardly toward the central cylindrical baffle 156. During the period of time that the dirt- and dust-laden air is in the cyclone separator 148, the relatively heavier particles entrained within the airstream will, by centrifugal action, be forced against the walls of the separator and then down the sides to the dust collecting tube 158. As indicated before, the tube 158 could be in communication with a dust or dirt collecting enclosure (not shown) or in communication with a device (also not shown) commonly known as an unloader valve. The unloader valve will pulse the collected dust to the atmosphere, and the pulsation action could be caused by or enhanced by the pistons of the engine in whose air intake system the air filter 136 may be connected. The now partially cleansed air is naturally redirected up to and flows through the interior portion of the central cylindrical baffle 156 and is, in turn, directed to the outside surface of the filter 160. The interior portion of the central cylindrical baffle 156 is in communication with a series of passages 162 which direct the flow to the aforementioned outer surface of the filter. The passages 162 are defined by the spaces of the multiple inlet passages 146. The filter may be of the same type of filter as the previously described air filters.

A conically shaped air deflector 164 is provided in the upper part 140 of the air filter 136. The conically shaped air deflector 164 is positioned with respect to the interior portion of the central cylindrical baffle 156 in such a manner as to efficiently direct the airflow from the cyclone separator to the passages 162 which, as indicated before, are in communication with the outer surface of the filter 160. The filter 160 is provided with seals 166 which insure that the filter 160 is in airtight relation with respect to the casing 138 so as to obviate any bypass of the dirt-laden air past the filter 160.

As previously described, the maximum efficiency of both the cyclone separator 148 and the dry type air filter 160 is maximized. The airflow is through the filter 160 and then out the air filter 136 via the outlet passage 168. The outlet passage 168, as described previously, may be in communication with the intake manifold or intake ducting of an engine (not shown). Further, the arrangement of the filter 160 with respect to the cyclone separator 148 is substantially the same as with respect to the previously described air filters and need not be further described.

The materials for the various parts of the air filters 10, 36, 64, 92, 118 and 136 could be fabricated from a wide range of materials. For example, the entire upper part of any of the various air filters could be made entirely of a plastic material including reinforced plastic materials as, for example, acrylonitrile-butadiene-styrene or polyvinylchloride. Individual elements of the upper part could be individually injection molded and then bonded together to form an integral unit. Or, in the alternative, the entire unit may be fabricated as a single piece by various molding or forming techniques, such as injection molding. The lower part of the various aforementioned filters may also be made of plastic and also may be formed by several techniques, including injection molding.

In addition to plastics, the various parts of the air filters 10, 36, 64, 92, 118 and 136 could be fabricated from many irons and steels as well as certain non-ferrous metals. The metal parts could be further selectively coated, depending upon application. For example, the lower part of the various filters could be fabricated from steel, such as low carbon sheet steel. The various parts could be stamped, deep drawn or rolled and welded, depending upon their size and shape.

It is obvious that many combinations of materials and fabricating techniques could be used in making an entire filter assembly in accordance with the present invention without departing from the spirit of the invention or the scope of the appended claims. It is also obvious that the cyclone separating means of the filters 10, 36, 64, 92, 118 and 136 could be replaced and substituted by other inertial separating means, such as a vortex-tube type inertial separating means. Such an inertial separating means would be positioned within the filters in a manner substantially similar to that of the cyclone separating means. The vortex-tube type separating means could include, for example, a tube having fixed or movable vanes disposed at the air inelt side. These vanes would compliment the preswirling action of the various parts of the aforementioned filters. In particular, the vanes would impart an additional swirling action to the inlet air and the centrifugal force produced by the total swirling motion imparted to that air will tend to separate the particulate matter from the airstream. The so separated dirt or dust will exit from the vortex-tube separating means in a manner substantially similar to the aforementioned cyclone separating means. It accordingly could be captured in a dust or dirt enclosure disposed within the tube, and such enclosure could be in communication with the atmosphere through an unloader valve.

Additionally, various changes could be made in the construction details and arrangement of the various parts of the invention also without departing from the spirit of the invention and the scope of the appended claims. In this regard it is important to note that the filters 10, 36, 64, 92, 118 and 136 have been provided with an inlet at one end of the filter and an outlet at the other end of the filter. It would be mere construction detail to rearrange the inlet and outlet so that they are both on the upper part or lower part of the respective filter so as to enable disassembly of the filter without breaking the inlet or outlet supply piping or tubing.

We claim:

1. An air filter for removing particulate matter and other impurities from an air stream comprising a generally cylindrical casing with a central axis and with multiple inlet passages extending from an outer surface of casing inwardly toward said central axis to communicate with a common inlet duct which encircles a central generally cylindrical baffle; said inlet duct having a series of openings through its interior wall adjacent said cylindrical baffle and a series of vanes to impart a pre-swirling motion to the uncleansed particulate-laden air passing through said openings into an inertial separating means centrally disposed within said casing; said inertial separating means including a cyclone separator having a lower, conically-shaped section and adapted to remove relatively heavy particles from the air stream; said cylindrical baffle having an interior passage therethrough communicating with a region above said inlet duct and spaces between said inlet passages for efficiently directing the air stream from said inertial separating means to the outer surface of the filter media of a filter enclosed within said casing and surrounding and coaxial with the entire length of said inertial separating means; said filter media removing substantially all of the remaining particulate matter and impurities from said air stream; and air guide means including the exterior surface of said conically-shaped section of said cyclone separator for efficiently directing the now cleansed air out of said air filter and through an outlet air passage at the lower end of said casing.

* * * * *